May 16, 1933.  W. F. EAMES ET AL  1,909,047

MOTOR CONTROL SYSTEM

Filed June 16, 1930

INVENTORS
William F. Eames and
William R. Harding
BY
Wesley G. Carr
ATTORNEY

Patented May 16, 1933

1,909,047

UNITED STATES PATENT OFFICE

WILLIAM F. EAMES, OF EDGEWOOD, AND WILLIAM R. HARDING, OF WILKINSBURG, PENNSYLVANIA, ASSIGNORS TO WESTINGHOUSE ELECTRIC AND MANUFACTURING COMPANY, A CORPORATION OF PENNSYLVANIA

MOTOR CONTROL SYSTEM

Application filed June 16, 1930. Serial No. 461,388.

Our invention relates to motor control systems and has particular relation to motor control systems of the variable voltage or Ward Leonard type. In such systems, the armature of a separately excited motor is connected in a local circuit with the armature of a separately excited, variable voltage generator, driven at substantially constant speed; the speed of the motor being determined by the excitation of the generator.

Such an arrangement permits operation of the motor at any speed within a wide range, each speed corresponding to a particular value of generator field current, but has the disadvantage that the motor speed varies somewhat from the value fixed by the generator field current, the variation of speed depending upon the motor load. This variation of speed represents a composite of various effects in the system, such as the IR drops in the armatures of the motor and generator, the speed regulation of the generator driving means, and, to some extent, armature reaction of the generator and motor. The composite result of all these effects is to cause the motor speed to fall with positive or motoring loads and to rise with overhauling or regenerative loads.

In order to compensate for this variation of speed with load, the generator is commonly provided with a cumulative series winding of sufficient number of turns to maintain the motor speed substantially constant over a range of loads. The degree of generator compounding necessary to accomplish this result is, in general, such that for a given increase of armature current, the generator terminal voltage increases an amount equal to, or greater than, the IR drop of the motor armature; depending upon whether the generator is compounded to compensate only for the IR drops in the armatures of the motor and generator, or for other effects also, such as the speed regulation of the generator driving means.

When the system is in operation, the terminal voltage of the generator is balanced against the sum of the IR drop in the motor armature and the counter-electromotive force of the motor. Upon a sudden change of motor torque, the armature current changes; the terminal voltage of the generator changes, being delayed somewhat by the damping effect of the generator separately excited field winding; the motor armature IR drop changes instantaneously; but the motor counter-electromotive force, which depends upon the motor speed, remains substantially constant. When the motor is operating at low speeds, the resistance in series with the generator separately excited field winding is high and the damping effect of the latter winding upon changes of generator terminal voltage in response to changes of armature current is negligible. Under these conditions, therefore, upon a sudden change of armature current, the substantially instantaneous change of generator terminal voltage is balanced, in the local circuit, only by the instantaneous change of motor armature IR drop.

The arrangement is, therefore, subject to the same conditions of stability as a series generator connected to a resistance load. The latter arrangement, as is well known, is unstable if the resistance of the load is less than the "critical resistance" for the generator. If this unstable relationship exists, the generator voltage and current build up to values determined by saturation of the generator magnetic circuit. Since in the arrangement first mentioned (Ward Leonard system with compounded generator), the generator voltage may change a greater amount than the motor armature IR drop for a given change of armature current, the generator may build up as a series generator, causing armature currents to exist of values different from the value fixed by the torque of the motor load.

Under these conditions, the arrangement is unstable, and continuous oscillations of armature current and motor speed may be developed such as result when it is attempted to operate a separately excited motor from a series generator, the armature resistance of the motor being less than the critical resistance of the generator. In this latter arrangement, upon a slight increase of armature current, the generator voltage increases, and as the IR drop of the motor armature is unable to balance the increased voltage of the generator, the armature current increases further, building up to a value determined by saturation of the generator magnetic circuit. This heavy current causes the motor torque to increase and the motor armature to accelerate. As the speed of the motor increases, its counter-electromotive force builds up, causing the armature current and the generator voltage to decrease. When the counter-electromotive force of the motor equals the voltage of the generator, the armature current falls to zero as does the generator voltage, and the motor counter-electromotive force, which is held up by the inertia of the motor armature, acts unopposed in the local circuit to reverse the armature current and generator voltage. The generator now builds up to saturation in the reverse direction, the heavy regenerative current brings the motor armature to rest and causes it to reverse, accelerating in the opposite direction until the motor counter-electromotive force becomes equal to the generator voltage, whereupon the process is repeated. The armature current and direction of motor rotation thus continue to reverse indefinitely.

In the Ward Leonard system with compounded generator, oscillations of this character may occur, but their severity is reduced by the damping action of the generator separately excited field winding, which tends to prevent rapid changes of generator voltage in response to changes of armature current. Where the Ward Leonard system is used as an elevator drive, such oscillations are noticeable and objectionable during deceleration of the car as the car speed falls to low values; the damping action of the generator separately excited field winding, under these conditions, being reduced by the high resistance in series with the winding. The general nature of the oscillations occurring under such conditions is illustrated in Fig. 2 of the accompanying drawing, in which motor speed and motor armature current as ordinates are plotted against distance of car travel as abscissæ.

It is, accordingly, an object of our invention to provide a variable voltage motor control system in which the speed of the motor may be adjusted and may be held at its adjusted value regardless of motor load, and in which means are provided for preventing variations of motor speed due to instability.

Another object of our invention is to provide a novel method of controlling a motor to vary the motor speed, correct the speed regulation of the motor at all speeds and to prevent oscillations of motor speed due to instability of the armature circuit.

Other objects of our invention will become evident from the following detailed description, taken in conjunction with the accompanying drawing, in which Figure 1 is a diagrammatic view of a system of control organized in accordance with the present invention.

According to our invention, we stabilize the electrical circuit, connecting the generator and motor armatures, by introducing a component of voltage in the circuit proportional to the rate of change of armature current and acting in a direction to oppose, during a change of armature current, the change of generator voltage caused by the series winding. This component is of such value that during rapid changes of armature current, the rate of change of the voltage applied to the motor armature is less than the rate of change of motor armature IR drop. Under these conditions, the circuit is stable; the generator cannot build up as a series machine, but upon the establishment of steady current conditions, the full effect of the series winding is introduced to correct the motor speed regulation.

While our invention may be practiced in a number of different ways, we prefer to provide a transformer having a winding connected in the local circuit of the generator and motor armatures, and a second winding connected in series with a field winding of the generator, so that the voltage component necessary to correct the stability of the local circuit is introduced by a transient condition in the generator excitation.

Figure 1:
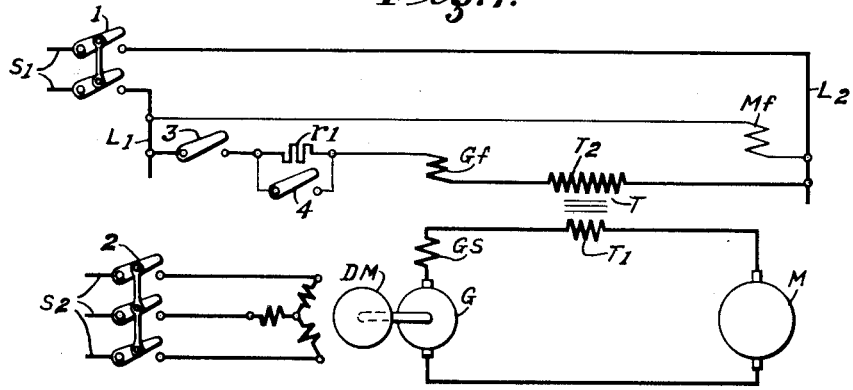
Figure 2:
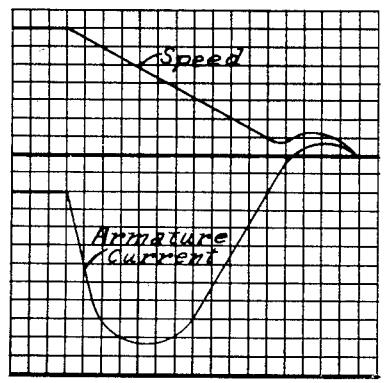
Fig. 2 is a diagram illustrating oscillations of motor speed and motor armature current which occur in systems of the prior art during deceleration of the motor.

Referring to the drawing, the apparatus shown in Fig. 1 comprises a direct-current motor M, having its armature connected in a local circuit which includes the armature and series field winding GS, of a direct current generator G and the primary winding T1 of a transformer T. A pair of supply conductors L1 and L2 for supplying the direct current used in the motor and generator separately excited field windings is arranged to be connected to a suitable direct-current source S1 by means of a switch 1.

The generator G is arranged to be driven at substantially constant speed by any suitable driving means DM, which we have illustrated as an induction motor. The windings of the induction motor DM are arranged to be connected to a suitable alternating current source S2 by means of a switch 2.

The separately excited field winding Mf of the motor M is connected to the supply conductors L1 and L2. The separately excited field winding Gf of the generator G is arranged to be connected to supply conductors L1 and L2, in a circuit which includes a resistor r1 and the secondary winding T2 of transformer T, by means of a switch 3. A switch 4 is connected in parallel with the resistor r1.

The cumulative series field winding GS of generator G is designed to compound the generator voltage a sufficient amount to maintain the speed of motor M substantially constant over a range of loads. The transformer T is so connected, that upon a change of armature current, the accompanying transient current in the field winding Gf sets up a component of generator terminal voltage opposing the change of voltage due to the action of series field winding GS. By this arrangement, the rate of change of generator voltage with respect to time, during rapid changes of armature current, may be made less than the rate of change of motor armature IR drop with respect to time, thus stabilizing the system by preventing the generator G from building up as a series generator.

The operation of the above described apparatus may be set forth as follows: Preliminary to operation of the motor M, the switches 1 and 2 are closed. Upon closure of switch 1, a circuit for the field winding Mf of motor M is completed. Upon closure of switch 2, the induction motor DM is connected to the alternating current source S2 and the induction motor DM and generator G accelerate to running speed.

The operation of motor M may now be controlled by switches 3 and 4. Upon closure of switch 3, the separately excited field winding Gf of generator G is connected to supply conductors L1 and L2 in series with resistor r1 and winding T2 of transformer T. The current in the field winding Gf now builds up to a low value, the generator G generates a low voltage, the armature current and torque of motor M build up, and the motor accelerates. As the speed of motor M increases, its counter-electromotive force increases, causing the armature current to fall, until finally a condition of equilibrium is reached at which the armature current is of such value that the torque developed by motor M is equal to the opposing torque of its load. The motor M now operates at low speed.

If the switch 4 is closed, the resistance r1 is short-circuited, the current in the generator field winding Gf builds up to a higher value, and the motor M accelerates to a high speed.

When it is desired to stop the motor, the switch 4 is first opened, reducing the motor speed to low speed value, and afterwards, the switch 3 is opened, breaking the generator field circuit and bringing the motor M to rest.

During operation of the motor M, the series field winding GS acts to raise the terminal voltage of generator G when the direction of power flow in the local circuit is from the generator G to the motor M, and to lower the terminal voltage of generator G when the direction of power flow in the local circuit is from the motor M to the generator G, a sufficient amount in either case to maintain the speed of motor M substantially constant regardless of load. During changes of armature current, the change of generator voltage due to the series winding GS is opposed by the component of generator voltage due to the transformer T acting upon the field winding Gf, establishing a condition of stability, as previously explained. As the armature current becomes steady, after a change, the voltage induced in the secondary winding T2 of transformer T falls to zero, and the generator voltage assumes the value, determined by the series winding Gs, necessary to correct the speed regulation of motor M. The transformer T thus acts only during changes of armature current, to prevent the generator G from building up as a series generator, but does not change the final value of generator voltage for any particular value of armature current, determined by the series winding Gs.

Figure 3:
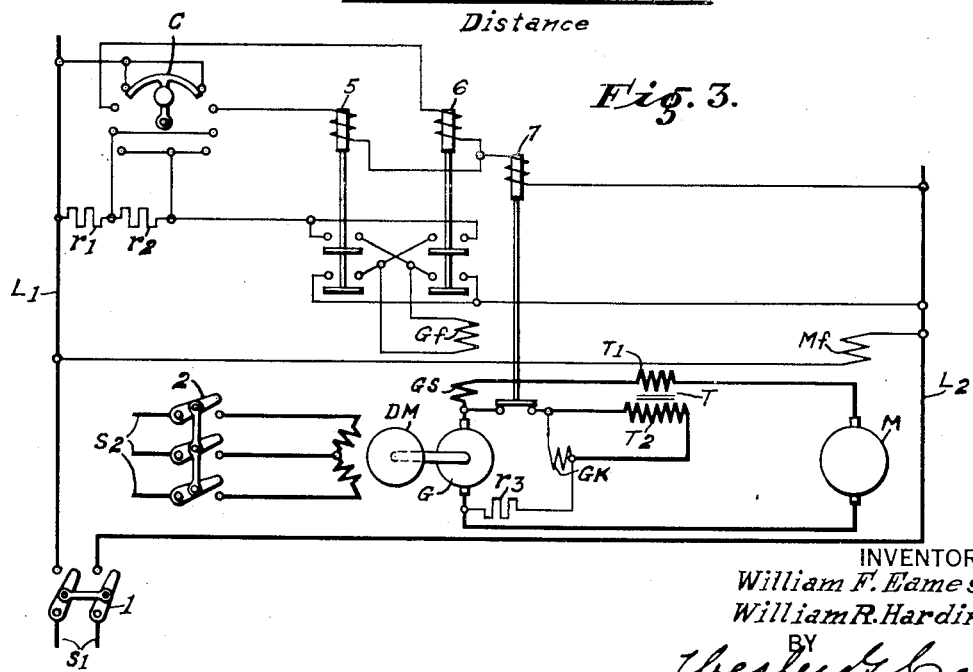
Fig. 3 is a diagrammatic view of a modification of the system shown in Fig. 1.

The modification shown in Fig. 3 comprises a direct current motor M having its armature connected in a local circuit which includes the armature and cumulative series-field winding GS of a direct-current generator G and the primary winding T1 of a transformer T. A pair of supply conductors L1 and L2 for supplying the direct current used in the control system is arranged to be connected to a suitable direct-current source S1 by means of a switch 1, as in Fig. 1.

The generator G is arranged to be driven at substantially constant speed by an induction motor DM. The windings of the induction motor DM are arranged to be connected to a suitable alternating-current source S2, by means of a switch 2, as in Fig. 1.

The separately excited field winding Mf of the motor M is connected to the supply conductors L1 and L2. The separately excited field winding Gf of the generator G is arranged to be connected to the supply conductors L1 and L2 in series with a pair of resistors r1 and r2, by either of a pair of reversing switches 5 and 6.

In addition to the separately excited field winding Gf, and the series winding Gs, the generator G is provided with a suicide winding Gk, arranged to be connected to the generator terminals in series with a resistor r3 by a switch 7. The secondary winding T2 of transformer T is connected in a local circuit with the suicide winding Gk.

The series field winding Gs, as in Fig. 1, is designed to compound the generator voltage a sufficient amount to maintain the speed of motor M substantially constant over a range of loads. The transformer T is so connected that upon a change of armature current, the accompanying transient current in the field winding G$k$ sets up a component of generator terminal voltage opposing the change of voltage due to the action of series field winding G$s$.

A manual controller C is arranged in its first operating position for one direction of motor rotation, to complete an energizing circuit for the operating coils of reversing switch 5 and switch 7. In its first operating position for the opposite direction of motor rotation, the manual controller C is arranged to complete an energizing circuit for the operating coils of reversing switch 6 and switch 7. In its second and third operating positions for either direction of motor rotation, the manual controller C is arranged to short-circuit resistors $r1$ and $r2$, respectively.

The operation of the modification shown in Fig. 3 is as follows: Preliminary to operation of the motor M, the switches 1 and 2 are closed. Upon closure of switch 1, a circuit for the field winding M$f$ of motor M is completed. Upon closure of switch 2, the induction motor DM is connected to the alternating current source S2, and the induction motor DM and generator G accelerate to running speed.

The operation of motor M may now be controlled by the manual controller C. Upon movement of the handle of manual controller C to the right to its first operating position, a circuit for the operating coils of reversing switch 5 and switch 7 is completed. Reversing switch 5 closes and switch 7 opens. Reversing switch 5, in closing, connects the field winding G$f$ of generator G to supply conductors L1 and L2 in series with resistors $r1$ and $r2$. Switch 7 in opening disconnects the suicide winding G$k$ from the armature terminals of generator G. The voltage of generator G now builds up to a low value and motor M accelerates to low speed in the manner described in connection with Fig. 1.

If the handle of manual controller C is moved farther to the right to its next operating position, resistor $r1$ is short circuited. The voltage of generator G now builds up to an intermediate value and motor M accelerates to intermediate speed.

If the handle of manual controller C is moved farther to the right, to its last operating position, resistor $r2$ is short-circuited. The voltage of generator G now builds up to its maximum value and the motor M accelerates to high speed.

In order to stop the motor M, the manual controller is returned to central position. This operation successively re-inserts the resistors $r2$ and $r1$ in series with the generator field winding G$f$, thereby reducing the speed of motor M to intermediate and low speed values, and finally breaks the circuit of switches 5 and 7. Switches 5 and 7 drop out. Reversing switch 5 in dropping out disconnects the field winding G$f$, thereby reducing the voltage of generator G to a low value determined by the residual magnetism of the generator. Switch 7, in dropping out, connects the suicide winding G$k$ to the generator terminals. The suicide winding G$k$ now acts, in a well known manner, to reduce the voltage of generator G to zero.

During operation of the motor M, the series winding G$s$ of generator G acts in the manner described in connection with Fig. 1 to correct the speed regulation of motor M. During changes of armature current, the transformer T acts upon the suicide winding G$k$ to stabilize the arrangement in the same manner as the transformer T of Fig. 1 acts upon the winding G$f$.

We do not wish to be restricted to the specific structural details, arrangement of parts or circuit connections here set forth, as various modifications thereof may be effected without departing from the spirit and scope of our invention. We desire, therefore, that only such limitations shall be imposed as are indicated in the appended claims.

We claim as our invention:

1. In a motor control system, a generator having characteristics such that its terminal voltage increases with increase of load, a motor having characteristics such that its armature IR drop increases with increase of load an amount not greater than the increase of terminal voltage of said generator for the same increase of load, a transformer, electrical connections completing a first circuit including the armatures of said generator and said motor and part of the windings of said transformer, electrical connections completing a second circuit including a field winding of said generator and part of the windings of said transformer, the relative direction of said field winding and said part of the windings of said transformer in said second circuit being such that currents induced in said second circuit in response to changes of current in said first circuit act upon said generator to stabilize said first circuit and means for stopping said motor including means for connecting said field winding to the armature of said generator.

2. In a motor control system, a generator having characteristics such that its terminal voltage increases with increase of load, a motor having characteristics such that its armature IR drop increases with increase of load an amount not greater than the increase of terminal voltage of said generator for the same increase of load, a field winding for said generator, electrical conductors completing a first circuit including the armatures of said generator and said motor, electrical connections completing a second circuit including said field winding, means inductively interconnecting said first and second circuits whereby in response to a change of current in said first circuit, a current is induced in said second circuit in a direction such that the rate of change of terminal voltage of said generator, in response to said change of current in said first circuit, is reduced, and means for stopping said motor, including means for connecting said field winding to the armature of said generator in a direction to reduce the voltage of said generator.

3. In a motor control system, a generator having a cumulative series winding and a second winding, a motor, electrical conductors connecting said series winding and the armatures of said motor and said generator in an armature circuit, electrical conductors connecting said second winding in a second circuit, an inductance device inductively connecting said armature circuit and said second circuit to stabilize said armature circuit and means for stopping said motor including means for connecting said second winding to the armature of said generator.

4. In a motor control system, a generator having a cumulative series winding and a second winding normally de-energized when said generator is generating a steady current at a steady voltage, a motor, electrical conductors connecting said series winding and the armatures of said motor and said generator in an armature circuit, electrical conductors connecting said second winding in a second circuit and an inductance device inductively connecting said armature circuit and said second circuit to stabilize said armature circuit, whereby said generator generates a transient stabilizing voltage during changes of current in said armature circuit and copper losses in said second circuit are eliminated when said armature circuit carries a steady current.

In testimony whereof, we have hereunto subscribed our names this 10th day of June, 1930.

WILLIAM F. EAMES.
WILLIAM R. HARDING.